United States Patent [19]

Ng

[11] Patent Number: 5,216,753
[45] Date of Patent: Jun. 1, 1993

[54] HALFTONE COMPRESSION WITH SHARPNESS PRESERVATION

[75] Inventor: Yee S. Ng, Fairport, N.Y.

[73] Assignee: Eastman Kodak Company, Rochester, N.Y.

[21] Appl. No.: 500,976

[22] Filed: Mar. 29, 1990

[51] Int. Cl.$^5$ .......................................... G06K 15/00
[52] U.S. Cl. .................................. 395/109; 395/132
[58] Field of Search ............... 395/101, 109, 115, 116, 395/132, 129; 358/298, 455, 456, 457, 458, 460; 346/154, 157; 340/703–704

[56] References Cited

U.S. PATENT DOCUMENTS

| | | | |
|---|---|---|---|
| 4,246,614 | 1/1981 | Knox | 358/283 |
| 4,786,975 | 11/1988 | Postl | 358/283 |
| 4,974,171 | 11/1990 | Yeh et al. | 395/109 |

*Primary Examiner*—Arthur G. Evans
*Attorney, Agent, or Firm*—J. Gary Mohr

[57] ABSTRACT

Method and apparatus for compressing and enhancing gray-level, halftone, image data in copiers and printers. The input data is digitally halftoned to provide input halftone cells containing a plurality of individual pixels. The pixel density distribution is examined to determine the relative position within the cell of the densest pixels. The gray-level density value for the entire cell is also ascertained. The distribution determines the particular threshold matrix which is used to convert the density value of the input cell into pixel density values which form an output halftone cell. The various matrices have distribution patterns which place the lower threshold values at the position in the output cell corresponding to the position of the densest pixels in the input cell. The cell density value and the matrix selection designator are stored in memory at different bit levels.

14 Claims, 4 Drawing Sheets

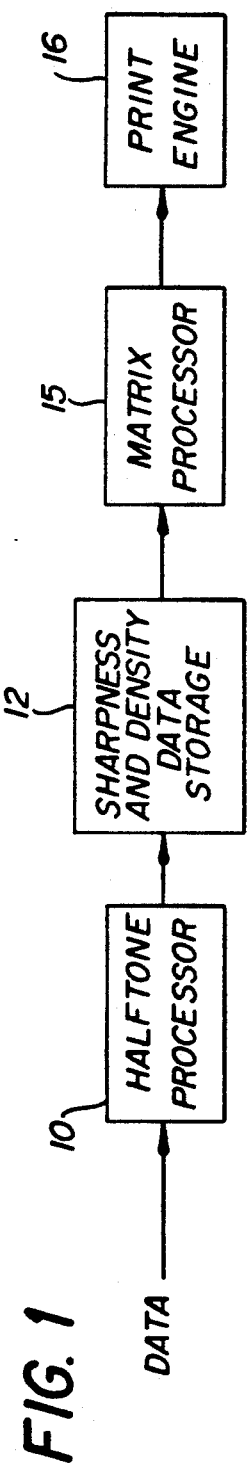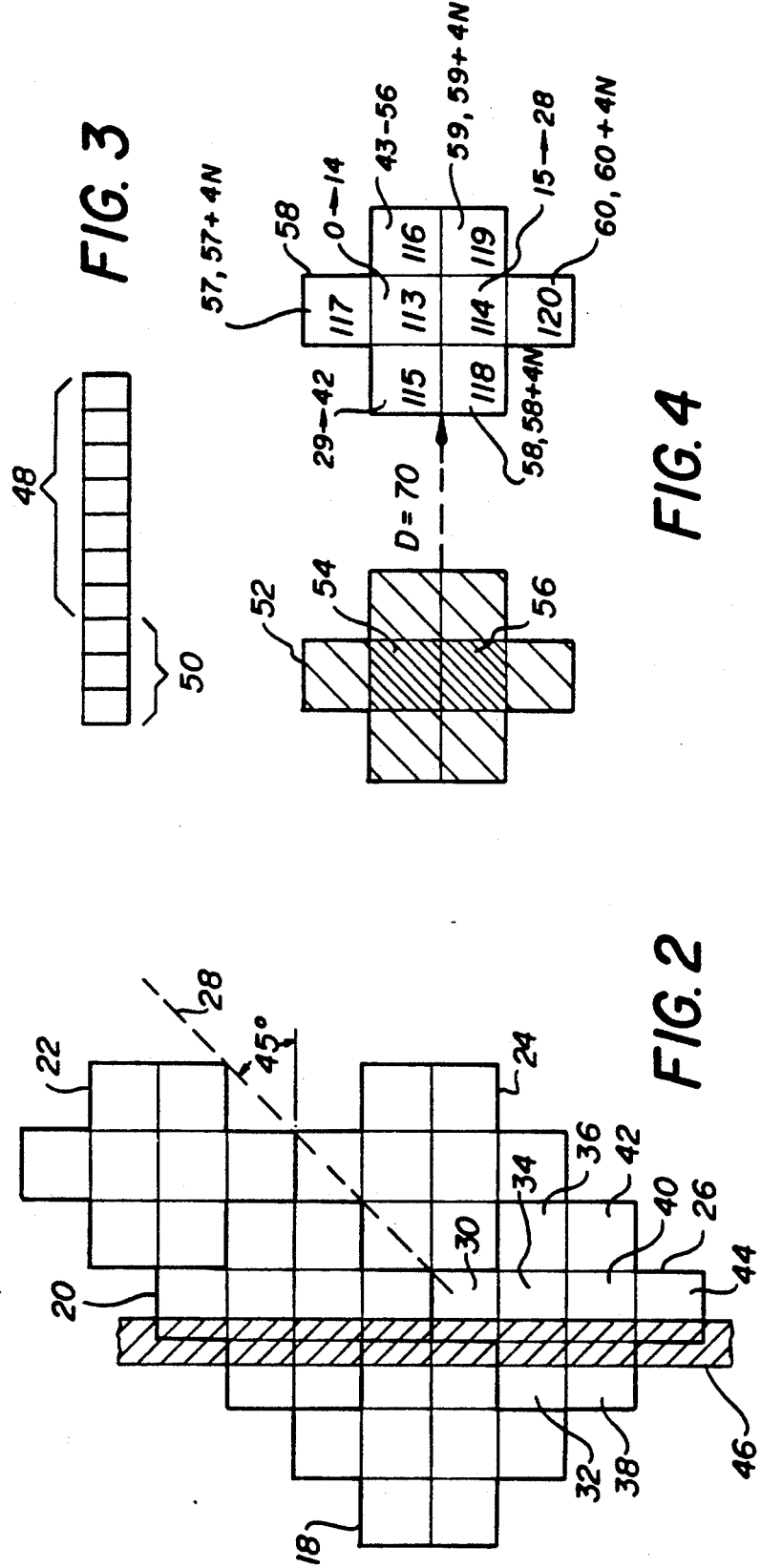

HALFTONE COMPRESSION WITH SHARPNESS PRESERVATION

BACKGROUND OF THE INVENTION

1. Field of the Invention

This invention relates, in general, to photocopying and, more specifically, to copiers and printers which use digital data to produce the hardcopy output image.

2. Description of the Prior Art

Copiers, printers, and like devices can use various types of input devices to provide the image data necessary to construct the output image, or hard-copy. Printers and electronic copiers, where the original document is scanned to obtain digital data, are capable of electronically processing the image data. Frequently, such processing is used to enhance the quality of the hard-copy output, reduce the memory requirements for economical storage of the image data in the device, and/or lower the data transmission time between device systems. Processing to reduce memory requirements is especially helpful when gray-levels are involved and when the devices are capable of rendering the output in color as well as monochrome.

Other image processing techniques are used in addition to compression. Halftoning is used to condition continuous tone image data for representation by a limited gray-level output rendering system, or print engine. Because such data is in digital form, digital halftone processing may be used to create the halftone screen which develops the halftone cells. However, both halftoning and compressing tend to cause a reduction in the sharpness or resolution of the image content. This occurs primarily because the halftone cell includes several pixels which are added or totaled together to determine the lightness or density level for the overall cell. The resolution provided by the individual pixels is lost because of the use of the pixel to establish the total density of the halftone cell.

Various prior art systems have been proposed to increase the effective resolution in halftoned cells. One such system is described in U.S. Pat. No. 4,246,614, issued on Jan. 20, 1981. The system described in this patent shifts the "black" center of the halftone cell to align the center-printed pixel with the corresponding "black" center in the video image signal. See column 3, lines 3-14. Other systems have been known in the prior art wherein dispersed dot or error diffusion have been used to improve the halftone resolution. While some of these offer certain advantages, they are computationally intensive and some offer no reduction in the memory space requirements.

Therefore, it is desirable, and an object of this invention, to provide gray-level, halftone, image processing which reduces memory requirements and preserves the resolution of the output image.

SUMMARY OF THE INVENTION

There is disclosed herein a new and useful image data processing system which reduces the data memory requirements and preserves much of the resolution contained in the original data. The original data is first converted into input halftone cells which have a total density value and a density distribution pattern associated therewith. Both parameters are stored in the memory at different bit levels to represent the halftone cells in compressed form. When the data is retrieved from memory for printing, the output halftone cell is reconstructed from the data by applying the total density value for each cell to a selected threshold matrix. The selected matrix is specified by the distribution pattern, or sharpness, portion of the data stored for the cell. The resulting output halftone cell is used by the rendering, or printing, device to produce gray-level pixels at specific locations within the output cell.

In a particular embodiment of the invention, the image data is converted into eight-pixel input halftone cells created along a 45° screen angle with a resolution of 141 cells per inch. Each pixel has a four-bit, 0-15 level, density detection capability. The overall 121 levels of density for the entire input cell is represented by a seven-bit binary number. The sharpness information for the cell is determined by analyzing the pixel density distribution within the cell. This information is stored at a lower bit level than the total density value. In the case of color printing, certain colors can be stored at a smaller bit level than others without lowering the apparent quality of the image as seen by an observer. In the case of two-bit sharpness resolution, four gray-level threshold matrix patterns are specified by two bits in the cell data. The specified matrix is used to process the stored cell density value into an output halftone cell which is rendered by the printer. Each matrix pattern causes the output pixels to be developed at different edges of the cell, corresponding to the pixel density distribution in the original input cell.

BRIEF DESCRIPTION OF THE DRAWINGS

Further advantages and uses of this invention will become more apparent when considered in view of the following detailed description and drawings, in which:

FIG. 1 is a block diagram illustrating the general functional environment where the invention is used;

FIG. 2 is a view illustrating several input halftone pixel cells;

FIG. 3 illustrates a memory word arrangement which compresses the image data;

FIG. 4 is a view illustrating an input halftone cell and its corresponding threshold matrix;

DESCRIPTION OF THE PREFERRED EMBODIMENTS

Figure 5:
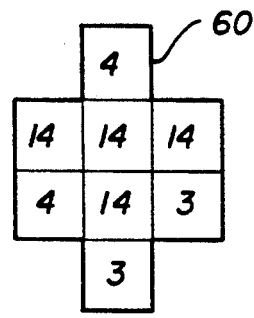
FIG. 5 is an output halftone cell produced by the matrix shown in FIG. 4.

Throughout the following description, similar reference characters refer to similar elements or members in all of the figures of the drawings.

Referring now to the drawings, and to FIG. 1 in particular, there is shown a block diagram illustrating the general functional environment wherein the invention is used. The data applied to the halftone processor 10 is derived from another device, such as a computer or workstation, or from the scanning of an original document on an electronic copier. For the purposes of this description, it will be assumed that the data applied to the processor 10 represents continuous tone image data. The halftone processor 10 converts this data electronically into halftone cells which are used, as is well known in the art, to allow the rendering of the continuous tone image by a rendering or printing device which is not capable of rendering or printing all of the density levels contained in the continuous tone image. According to this invention, and to block 12 of FIG. 1, data representing both the sharpness, or pixel location, and the density of the halftone cell, is stored in memory. At the appropriate time, this data is applied to the matrix processor 15 which uses the stored values to form an output halftone cell which can be rendered by the print engine 16. By using this arrangement, compression of the image data is achieved without losing all of the sharpness detail due to the halftoning process.

FIG. 2 is a view illustrating several halftone input pixel cells which may be constructed by the image data halftone processor 10 of FIG. 1. According to FIG. 2, the input halftone cells 18, 20, 22, 24 and 26 are produced when a halftone screen is used at a 45° angle to the input pixel orientation, as indicated by line 28. For purposes of this description, each pixel within a pixel cell is 1/400th of an inch, which is equivalent to a resolution of 400 dots per inch (dpi). The resulting halftone cells occur at the rate of 141 cells per inch with the 45° halftoning illustrated.

Input cell 26 includes the individual pixels 30, 32, 34, 36, 38, 40, 42 and 44 in the arrangement shown in FIG. 2. To illustrate the relationship between the input pixels and image data contained therein, a line 46 is illustrated running across input cells 18, 20 and 26. In other words, the digital values for the pixels contained in these halftone cells represent a density which would be produced by the image line 46. For example, pixel 44 has a density value which is a result of the portion of the line 46 passing through pixel 44. This density value would not equal the maximum value possible since only a portion of the line 46 passes through pixel 44. Pixels 30, 32, 34, 38 and 40 also have density values which are the result of line 46. In this illustration, pixels 36 and 42 are represented by a digital density value which is representative of an absence of any dark image within these two pixels.

The total or overall density value for the cell 26 is determined by adding the density values of the individual pixels comprising the input cell 26. This total density value represents the total or overall gray-level of this input cell and is used to represent the input cell to the remaining portions of the apparatus which are used to store and print the information in the input cell. However, including only the total gray-level information does not convey any information about the position of the line 46 through the cell 26. Assuming, for the purposes of this description, that four-bit, or 16-level quantitazation can be made for each pixel, an overall lightness level or density for the entire input cell can be represented by a total of 121 different values. This information, or value, can easily be stored in seven bits of a digital word defining the image data contained within the cell 26. Representative density values for the pixels 30–44 may be 5, 5, 5, 0, 5, 5, 0, 5, respectively. The total value for the cell 26 would be 30.

FIG. 3 illustrates a memory arrangement which effectively compresses the data representing the input cells. The seven bits 48 shown in FIG. 3 are used for storing the value which is equal to the possible 121 lightness or density levels for the cell. The remaining three bits 50 are used to store information about the density distribution, or sharpness distribution, within the input cell. The distribution pattern within the cell can adequately be defined by using one of the eight pixels in the cell as the area where the pixels are densest. These eight locations can be stored by the three-bit number that is stored in bits 50. However, in some applications, this amount of preciseness is not needed to ultimately produce a high quality image in the eyes of the observer. For this reason, a smaller number of distribution patterns within the cell can be used to provide information about the sharpness of the input cell. For example, two bits may be used instead of three to define four specific regions of the input cell which contain the densest pixels.

Using two-bit sharpness information for some colors, in color rendering apparatus, and using three-bit sharpness information for other colors, also provides compression of the data which gives satisfactory outputs in the view of the observer. This can be accomplished since not all colors are equally important in the halftone cell as far as the sharpness information is concerned. For example, when the data represents a yellow frame of printing, two-bit information can be used compared to using three-bit sharpness information when printing another color, such as cyan, which is more dominant to the observer in judging the sharpness of the printed image.

The compression provided by this arrangement should be apparent. With three-bit sharpness resolution, the cell can be represented by ten bits. Without this arrangement, it would require four bits for each of the eight pixels for a total of 32 bits to represent the cell. Thus, the compression ratio provided by this invention is 3.2/1. Additional compression can be achieved by storing a difference value from a previous cell for the density of the current cell. This could be referenced to the immediately preceding cell scanning across the page and/or from a cell located above the present cell.

FIG. 4 is a view illustrating an input halftone cell and the corresponding threshold matrix which is used to develop the output halftone cell used for printing. The input cell 52 contains eight pixels, including the center located pixels 54 and 56. These center pixels, for purposes of illustration, represent areas where the original image was relatively dense. The other six pixels in the cell 52 represent areas where the original image which the cell represents had only an intermediate density. The total density for the cell is the total of the densities for each of the pixels. For purposes of this illustration, a density value "D" of 70, based upon a maximum value of 121 for the entire cell, will be used.

The threshold matrix 58 is used to convert the overall gray-level of 70 from the input cell 52 into a gray-level output cell which will be rendered by the print engine. The threshold matrix 58 contains eight different threshold criteria corresponding in location to the eight pixels in the output halftone cell. The gray-level value 70 is applied to this matrix in a systematic order to determine the printed pattern to be used in the output cell. It should be emphasized that the pattern of the threshold values in threshold matrix 58 has been predetermined. The selection of a particular predetermined threshold distribution within the matrix 58 depends upon the sharpness information contained in the stored memory for the input cell 52. Since the input cell 52 has its maximum density pixels located around the center of the cell, the matrix 58 represents the threshold matrix which is used when that type of distribution is represented by the total gray-level value.

According to FIG. 4, the gray-level of 70 is applied to the threshold matrix 58 to decide what and how particular pixels in the output cell will be printed. The matrix location containing the threshold value of 113, which corresponds to pixel 54, is used to set the lowest threshold level. Since the total value of 70 is less than 113, the threshold for this location is not achieved. If the threshold level had been achieved, the pixel to be printed corresponding to this location would be at the maximum, or 15th, level in a four-bit, 0–15 level printing system. Even though the threshold level of 113 has not been met by the total gray-level of 70 applied to the matrix, a value of 14 will be printed at this location, which is one value below the maximum value, although the values rendered by the printing apparatus are not necessarily linear. For the sake of illustration, had the total input value been 12, the location corresponding to threshold level 113 would have been represented at a level 12.

The next higher threshold level of 114, which corresponds to pixel 56, is shown below the previous matrix location and, since the applied value of 70 does not exceed this threshold value either, the maximum value of 15 would not be represented at this location. The applied value of 70 has been reduced by 14 from the previous location, thereby leaving a value of 56 which is still greater than the other 15 gray-levels which can be printed for the location containing the threshold of 114. Thus, this location is also printed at a level of 14 out of the 0–15 levels. In other words, since the value of 70 is larger than 28 and smaller than 114, which are respecively the threshold values for gray-levels 14 and 15, level 14 is printed instead of level 15 for this pixel.

In general, the threshold values between 113 and 120 for the eight locations in the threshold matrix 58 determine whether the highest or densest level will be printed in these locations, regardless of the level used in other pixels. If the threshold is not reached, a lower printing level is used which accumulates until the value of the input density is reached. Thus, printing levels 14 are also produced at the locations where the threshold values are 115 and 116. The output halftone cell 60 shown in FIG. 5 illustrates these printing levels. The remaining four locations, which include threshold values 117 through 120, act similarly on the actual threshold value but function differently on the values when the threshold is not reached. As shown in FIG. 4, the accumulated density value ranges from an indicated number to a series of other numbers up to the maximum density level. For example, in the location containing threshold 117, the intermediate gray-level values of 57 up through 57+4N, where N is equal to a number between 1 and 14, is used. At the time of applying the overall digital value of 70 to this threshold location, 14×4 or 56 lightness levels have been represented in the first four pixel locations. There are four intermediate levels in the next matrix location (57, 61, 65 and 69), thus the fourth level of density is printed at this location, as represented in output cell 60 of FIG. 5. The density values for the cell with the 118 threshold are 58, 62, 66 and 70. The density values for the matrix location with the 119 threshold are 59, 63, 67 and 71 and the density values for the remaining matrix location are 60, 64, 68 and 72. Additional density values up to 121 can be represented in these locations, but are not important here since the applied density is only 70. Therefore, as again shown in FIG. 5, the pixel density distribution decreases to the third level for the last two pixels since there are only three threshold levels below the maximum value of 70.

Adding all of the individual pixel density levels in output cell 60 provides the total value of 70 which was applied to the threshold matrix 58, of FIG. 4. Therefore, the threshold matrix 58 produces an output halftone cell which is used for printing by the print engine wherein the center pixels of the cell contain the maximum or densest values within the cell much the same as the input cell 52, and the total density of the output cell 60 is equal to the total density of the input cell 52. Thus, not only is the total density preserved in this arrangement, there is a definite correspondence between the sharpness of the output cell and the pixel distribution in the input cell. Depending upon how many threshold matrices are used to evaluate or convert the density information into output pixel densities, the sharpness information can be conveyed by a few bits in the stored data for each cell.

Figure 6:
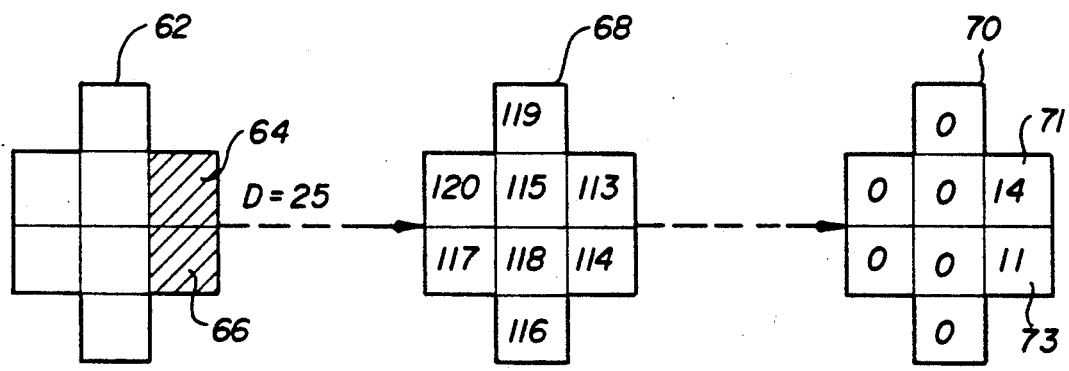
FIG. 6 is a view illustrating input, matrix, and output cells for right-edge pixel distributions.

In the case where four threshold matrices are used to define the sharpness information of the input cell, the sharpness information can be contained in two bits. FIGS. 6, 7, 8 and 9 illustrate the application of threshold matrices which have values arranged to convert a total density value into output cells aligned with substantially the same pixel density distribution as the input cell. In FIG. 6, the input halftone cell 62 contains pixels 64 and 66 which are the densest pixels in the cell and are aligned along the right edge of the cell. For purposes of illustration, the total density value for the cell 62 is assumed to be 25 on a scale of 0–120 density, or lightness, levels. The threshold matrix 68 is selected by the two-bit sharpness data and has the threshold values arranged within the matrix 68 as indicated. The intermediate gray-level values also used in constructing the output cell are not shown in the matrix 68 for clarity. These values can be seen in cell 58 of FIG. 4. As can be seen, the lowest thresholds are aligned at the right edge of the threshold matrix, thus causing the pixels in the output cell 70 to start building or forming along this edge before forming at any other portion of the output cell. Thus, the pixels 71 and 73 in output cell 70 will be printed at the indicated gray-levels of 14 and 11 on a scale of 0–15. Level 15 is not printed in either pixel since the total level of 25 does not meet the threshold levels of 113 or 114 for these pixels. Density level 14 is printed in pixel 71 and density level 11 is printed in pixel 73 since only 11 density levels are needed to achieve the total of 25 for the entire output cell 70.

Figure 7:
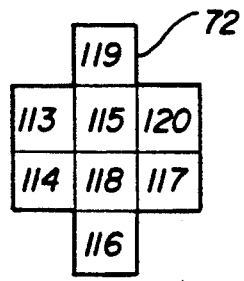
FIG. 7 is a threshold matrix used with left-edge pixel distribution.
Figure 8:
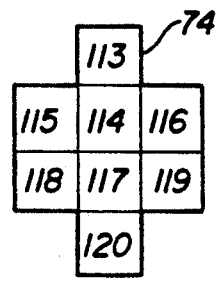
FIG. 8 is a threshold matrix used with top-edge pixel distribution.
Figure 9:
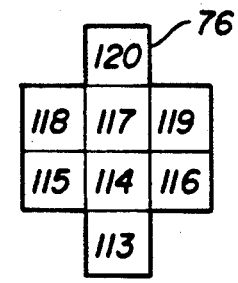
FIG. 9 is a threshold matrix used with bottom-edge pixel distribution.

In FIG. 7, the threshold matrix 72 has the lowest threshold levels adjacent to the left side or edge of the threshold matrix. This, in effect, causes the build-up or formation of the output pixels beginning at the left side of the output cell. This type of matrix distribution would be used when the input cell pixel distribution is grouped mainly around the left edge or side of the input cell. In FIG. 8, the threshold matrix 74 begins the thresholding process at the top edge of the cell by having the lowest threshold values at these locations. On the other hand, threshold matrix 76, shown in FIG. 9, has the lowest threshold values located at the lower or bottom edge of the cell. It should be apparent that matrix 74 would be used when the input pixel distribution contains the densest pixels near the top edge of the input cell, and the matrix 76 would be used when the densest pixels are at the bottom edge of the input cell.

Figure 10:
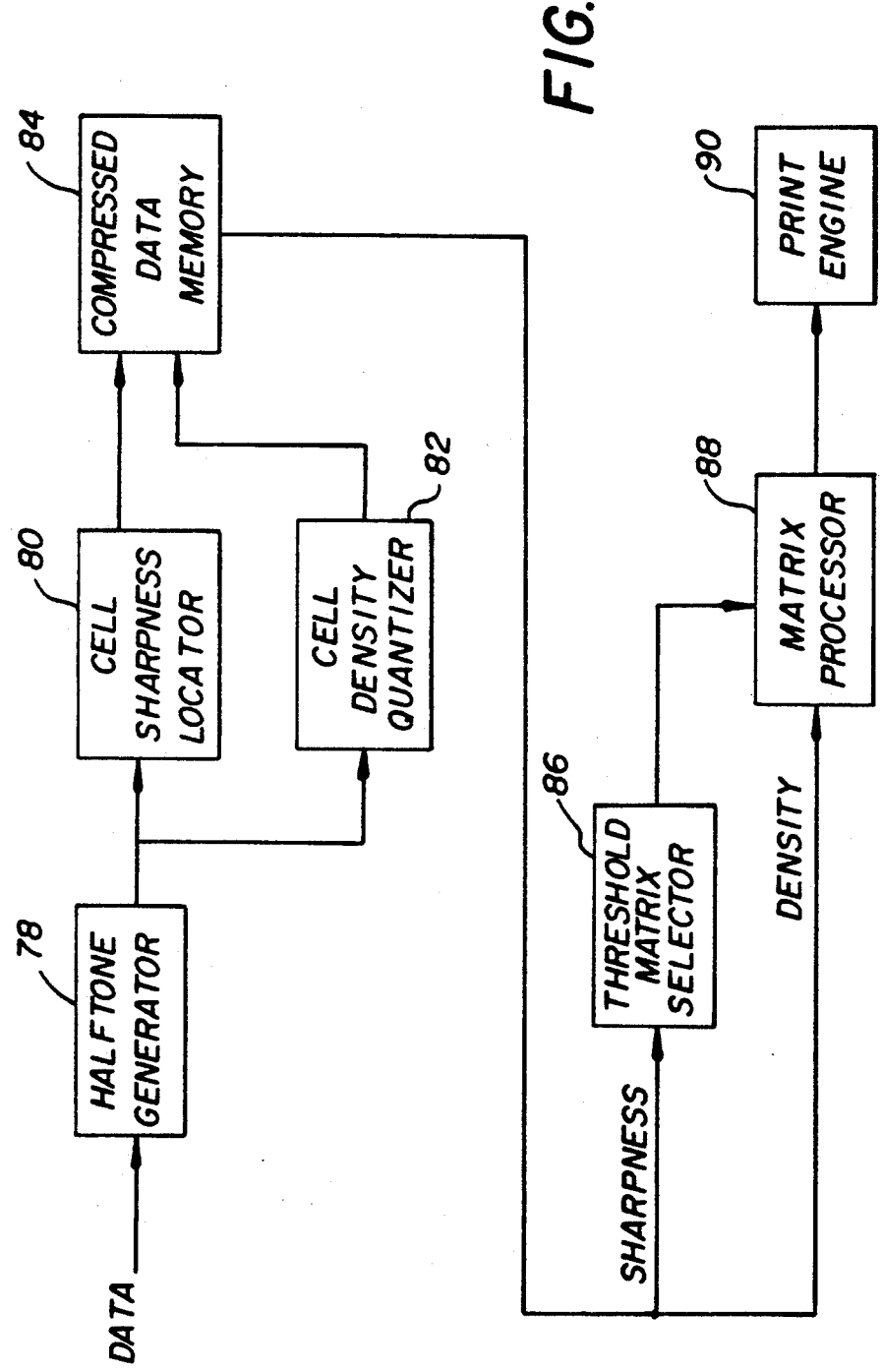
FIG. 10 is a block diagram of apparatus used to compress halftone data according to this invention.

FIG. 10 is a block diagram of apparatus used to compress halftone data according to this invention. The halftone generator 78 takes the input data and converts it into halftone cells according to a specific pattern and density criteria. These half-tone cells are analyzed to determine the sharpness or pixel distribution in cells, as indicated by block 80, and to determine the overall density of the half-tone input cell, as indicated by block 82. Density quantitazation can be achieved by summing the density of the individual pixels, and sharpness location can be achieved by analyzing the pixel distribution gradient within the cell. This data is stored, in compressed form, in the memory 84. When the printer or rendering device is ready to use this data, the data is removed from the memory 84 and separated into the sharpness and density bits for each cell. The threshold matrix selector 86 takes the sharpness data, which was described herein as being either two bits or three bits although other levels may be used, and determines which matrix will be used by the matrix processor 88. Once determined, the density is applied to the processor 88 and the output halftone cell is created and applied to the print engine 90, which is comparable to the print engine 16 shown in FIG. 1.

Figure 11:
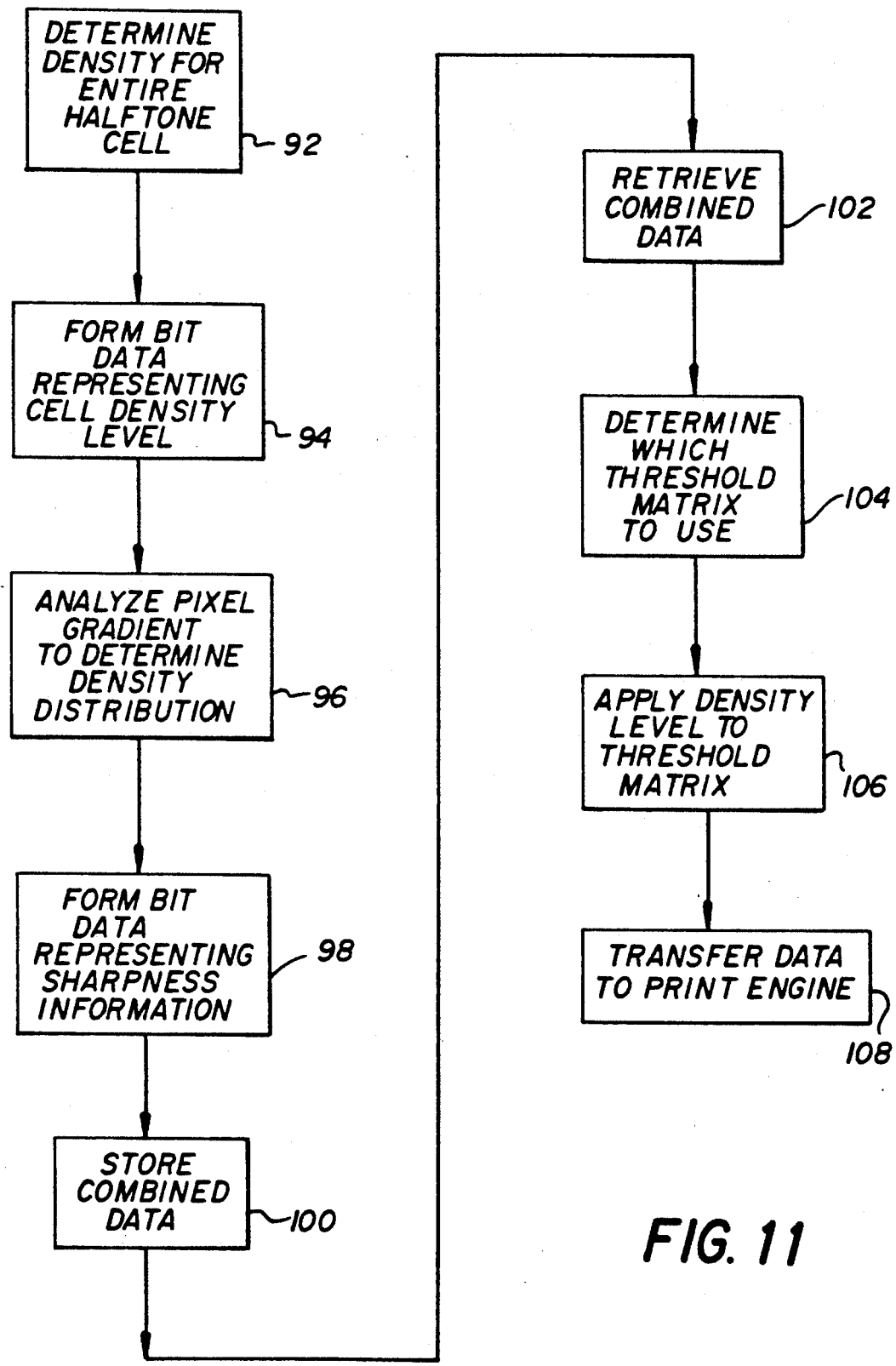
FIG. 11 is a flow chart illustrating the operation of the apparatus shown in FIG. 10.

FIG. 11 is a flow chart illustrating the operation of the apparatus shown in FIG. 10. According to step 92, the density for the entire halftone input cell is first determined. Then, according to step 94, the density value is converted to a binary number which represents the overall density of the input halftone cell. Next, the pixel gradient within the input cell is analyzed to determine the density distribution as indicated in step 96. In step 98, bit data is formed which represents the sharpness information previously determined so that the matrices can be selected accordingly later in the operation. In step 100, the data is stored in combined form and then retrieved at the appropriate time according to step 102. The data is analyzed, according to step 104, to determine which matrix will be used in the thresholding process of converting the density value, also retrieved from memory, into a workable output cell pattern. According to step 106, the threshold matrix is used to convert the density level into the output cell which is transferred, according to step 108, to the print engine for rendering as a hard-copy output from the device. However, it is emphasized, that other forms of output, such as a video representation of the image data, is within the contemplation of this invention.

It is also emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. Data processing apparatus for processing image data which is to be printed by a gray-level print engine, said apparatus comprising:
   means for converting the image data into halftone input cells;
   means for determining the sharpness distribution of the input cell by analyzing the density and location of the individual pixels in the input cell;
   means for representing the total gray-level of the entire input cell at a first bit level and for representing the sharpness distribution at a second bit level;
   a memory system for storing gray-level and sharpness bits at their respective bit levels for determining which of at least four distribution patterns are to be used in determining where to locate the densest pixels in the cell;
   means for retrieving and processing the stored bits to form an output cell having a plurality of gray-level pixels, with the total gray-level of the output cell corresponding to an overall value defined by said gray-level bits, and with a distribution pattern of the density of the individual pixels in the cell based upon said sharpness bits; and
   means for processing the overall value represented by the gray-level bits with a matrix of threshold levels and gray-level values for each pixel in the output cell to form the values used for the individual gray-level pixels in the output cell, using only the densest level for a pixel if the overall value represented by the gray-level bits meets the threshold level for that pixel, regardless of the density level used in other pixels of the cell and choosing the density level for a particular pixel, when the overall value does not meet the threshold level based upon the levels used for previous pixels and the overall density value.

2. The data processing apparatus of claim 1 wherein each distribution pattern causes the densest pixel to be located substantially along different edges of the halftone output cell.

3. The data processing apparatus of claim 1 wherein the sharpness distribution determining means analyzes the pixel density gradient within the input cell.

4. The data processing apparatus of claim 3 wherein the determining means also analyzes the density gradient of at least one adjacent halftone cell.

5. The data processing apparatus of claim 1 wherein the first bit level is seven bits for representing 121 gray levels for the cell, and the second bit level is two bits for representing four sharpness distribution patterns for the cell.

6. Data processing apparatus for processing image data which is to printed by a four-bit gray-level print engine, said apparatus comprising:
   means for converting the image data into halftone input cells having eight pixels per cell with a resolution of 141 cells per inch at a 45° angle;
   means for determining the sharpness distribution of the input cell by analyzing the pixel density gradient across the input cell and at least one adjacent halftone input cell;
   means for representing the total of 121 gray levels of the entire input cell at a seven-bit level and for representing the sharpness distribution at a two-bit or three-bit level;
   a memory system for storing gray-level and sharpness bits at their respective bit levels which sharpness bits determine which of at least four distribution patterns of threshold and gray-level values are to be used in determining the density of pixels in the cell;
   means for retrieving the stored bits from the memory system; and
   means for processing a single value represented by the gray-level bits with a matrix of threshold levels and gray-level values for each pixel in an eight-pixel output cell capable of printing 16 levels of gray in each pixel;

said processing causing the densest level to be used for a pixel if the single value meets the threshold level for that pixel, regardless of the density level used in other pixels of the cell, and, if the single value does not meet the threshold level, causing the level to be dependent upon the single value and the levels used for previous pixels in the cell with each distribution pattern causing the densest pixel to be located substantially along different edges of the halftone output cell;

said output cell having an overall gray-level corresponding to said single value, and the distribution of the gray-level values in said matrix being dependent upon the sharpness distribution bits.

7. The data processing apparatus of claim 6 wherein the sharpness bits determine which of at least four distribution patterns of threshold and gray-level values are to be used in determining the density of pixels in the cell.

8. The data processing apparatus of claim 7 wherein each distribution pattern causes the densest pixel to be located substantially along different edges of the halftone output cell.

9. A method of processing image data which is to be printed by a gray-level print engine, said method including the steps of:

converting the image data into halftone input cells;

determining the sharpness distribution of the input cell;

representing the total gray-level of the entire input cell at a first bit level;

representing the sharpness distribution of the input cell at a second bit level;

storing gray-level and sharpness bits at their respective bit levels in a memory system;

retrieving the stored bits and processing them into an output cell having a plurality of gray-level pixels, said output cell having an overall gray-level value corresponding to said gray-level bits and a distribution pattern of the density of the individual pixels determined by said sharpness bits;

applying the total gray-level value to a matrix of threshold values and gray-level values, with the matrix including values for each pixel position in the output cell;

designating the densest gray-level for any pixel where the threshold is met, regardless of the density level used in other pixels of the output cell; and designating an intermediate gray-level for any pixel where the threshold is not met, with the gray-level being dependent upon the levels designated for other pixels in the output cell.

10. The image data processing method of claim 9 wherein the sharpness distribution is represented at a different second bit level for at least one different color.

11. The image data processing method of claim 10 wherein the sharpness distribution corresponding to yellow is represented at a two-bit level and the sharpness distribution corresponding to cyan is represented at a three-bit level.

12. The image data processing method of claim 10 wherein the distribution of the threshold and gray-level values in the matrix is governed by the sharpness bits.

13. The image data processing method of claim 12 wherein four different value distributions are used to cause the densest pixel to be located substantially along different edges of the halftone output cell.

14. The image data processing method of claim 9 wherein the total gray-level is represented by a difference value from a previously processed gray-level value.

* * * * *